(12) United States Patent
Thomsen et al.

(10) Patent No.: US 8,615,632 B2
(45) Date of Patent: Dec. 24, 2013

(54) CO-STORAGE OF DATA STORAGE PAGE LINKAGE, SIZE, AND MAPPING

(75) Inventors: Dirk Thomsen, Heidelberg (DE); Ivan Schreter, Malsch (DE)

(73) Assignee: SAP AG, Walldorf (DE)

( * ) Notice: Subject to any disclaimer, the term of this patent is extended or adjusted under 35 U.S.C. 154(b) by 295 days.

(21) Appl. No.: 13/072,650

(22) Filed: Mar. 25, 2011

(65) Prior Publication Data

US 2012/0246440 A1    Sep. 27, 2012

(51) Int. Cl.
*G06F 12/16* (2006.01)

(52) U.S. Cl.
USPC ......................................................... 711/118

(58) Field of Classification Search
None
See application file for complete search history.

(56) References Cited

U.S. PATENT DOCUMENTS

| | | | |
|---|---|---|---|
| 2002/0046204 A1* | 4/2002 | Hayes | 707/1 |
| 2005/0149472 A1* | 7/2005 | Schreter | 707/1 |
| 2005/0267816 A1* | 12/2005 | Jaramillo | 705/26 |
| 2006/0095910 A1* | 5/2006 | Norton et al. | 718/100 |
| 2008/0288713 A1* | 11/2008 | Lee et al. | 711/103 |

* cited by examiner

*Primary Examiner* — Duc Doan
(74) *Attorney, Agent, or Firm* — Mintz, Levin, Cohn, Ferris, Glovsky and Popeo, P.C.

(57) ABSTRACT

A logical page identity for a logical page containing data storage application data can be mapped to a physical storage page location in a storage where the data of the logical page are stored. The mapping as well as additional page data can be retained within a persistence layer accessible to the data storage application. The additional page data can include at least one of a size of the page and a next page linkage indicating a second page that follows the page in a page sequence of related pages. The retained mapping and additional page data can be retrieved from the persistence layer to initiate a page operation on the related pages, and the page operation can be executed on the related pages based on the retrieved mapping and additional page data. Related methods, systems, and articles of manufacture are also disclosed.

13 Claims, 4 Drawing Sheets

US 8,615,632 B2

CO-STORAGE OF DATA STORAGE PAGE LINKAGE, SIZE, AND MAPPING

TECHNICAL FIELD

The subject matter described herein relates to optimizing performance in data storage applications (e.g. a database) and other computing environments in which data are written and/or read from a storage medium or storage device.

BACKGROUND

Storage pages can be used in association with a data storage application that writes and/or reads data from a persistency layer that can include active data stored in fast but relatively expensive memory that is in turn written to a less expensive storage for longer term retention. The persistence layer can ensure that changes made within the data storage application are durable and that the data storage application can be restored to a most recent committed state after a restart. A committed state is achieved by writing the changes made to data in the persistence layer to the longer term storage. Data are stored in the longer term storage are organized in storage pages, a term that refers to a unit of physical storage.

A shadow paging technique can be used in conjunction with data storage applications to avoid overwriting an existing version of a page with changes until the changes are ready to be committed to longer term storage. For example, shadow paging can be used to undo changes that were written to the longer term storage since a most recent savepoint. A shadow page can be allocated to retain the original state of a logical page when the logical page is to be modified. A storage page retained in the longer term storage at a most recent savepoint are not overwritten until a subsequent savepoint is successfully completed. Instead, new physical pages are used to store changed logical pages. Therefore, until the subsequent savepoint is written to longer term storage, two physical pages may exist for one logical page: a shadow page containing the version written during the most recent savepoint, and a current physical page reflecting changes written to longer term storage since the most recent savepoint.

SUMMARY

In one aspect, a method includes mapping a logical page identity for a logical page containing data storage application data to a physical storage page location in a storage where the data of the logical page are stored. The mapping and additional page data that include at least one of a size of the page and a next page linkage indicating a second page that follows the page in a page sequence of related pages are retained within a persistence layer accessible to the data storage application. The retained mapping and additional page data are retrieved from the persistence layer to initiate a page operation on the related pages, and the page operation is executed on the related pages based on the retrieved mapping and additional page data.

In some variations one or more of the following features can optionally be included in any feasible combination. The data storage application can include at least one of a database application and a network-attached storage system. The additional page data can include one or more of the size of the page and the next page linkage indicating the second page that follows the page in the page sequence of related pages. The page operation can include at least one of deleting the page and the second page, prefetching the page and the second page in parallel, and traversing the related pages in the page sequence. The logical page can be a shadow page.

Articles are also described that comprise a tangibly embodied machine-readable medium operable to cause one or more machines (e.g., computers, etc.) to result in operations described herein. Similarly, computer systems are also described that may include a processor and a memory coupled to the processor. The memory may include one or more programs that cause the processor to perform one or more of the operations described herein.

Implementations of the subject matter described herein can optionally provide one or more advantages. For example, substantial performance gains can be realized for a variety of operations, potentially including but not limited to deleting a container, seeking within a container, prefetching, and the like.

The details of one or more variations of the subject matter described herein are set forth in the accompanying drawings and the description below. Other features and advantages of the subject matter described herein will be apparent from the description and drawings, and from the claims. For example, while the specific examples described below to illustrate features of the current subject matter make reference to the data storage application being a database, other types of data storage applications are within the scope of the current subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

Figure 1:
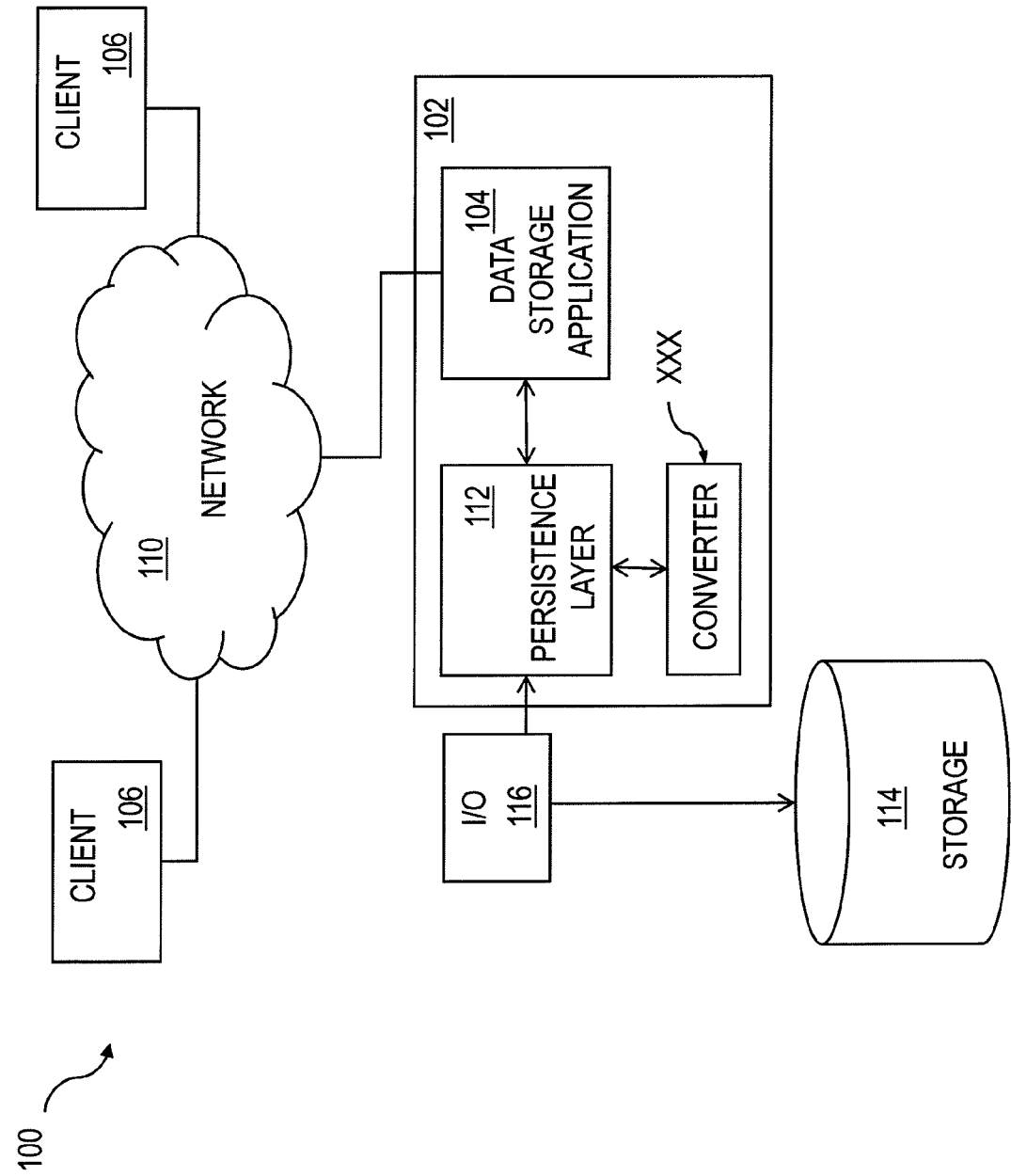
FIG. 1 is a box diagram illustrating aspects of a system at least some of whose features are consistent with implementations of the current subject matter.

FIG. 1 shows an example of a system 100 in which a computing system 102, which can include one or more programmable processors that can be collocated, linked over one or more networks, etc., executes one or more modules, software components, or the like of a data storage application 104. The data storage application 104 can include one or more of a database, an enterprise resource program, a distributed storage system (e.g. NetApp Filer available from NetApp of Sunnyvale, Calif.), or the like.

The one or more modules, software components, or the like can be accessible to local users of the computing system 102 as well as to remote users accessing the computing system 102 from one or more client machines 106 over a network connection 110. One or more user interface screens produced by the one or more first modules can be displayed to a user, either via a local display or via a display associated with one of the client machines 106. Data units of the data storage application 104 can be transiently stored in a persistence layer 112 (e.g. a page buffer or other type of temporary persistency layer), which can write the data, in the form of storage pages, to one or more storages 114, for example via an input/output component 116. The one or more storages 114 can include one or more physical storage media or devices (e.g. hard disk drives, persistent flash memory, random access memory, optical media, magnetic media, and the like) configured for writing data for longer term storage. It should be noted that the storage 114 and the input/output component 116 can be included in the computing system 102 despite their being shown as external to the computing system 102 in FIG. 1.

In many currently available data storage applications, the only information stored by a data storage application are those required to map a logical page to the physical location of one or more storage pages corresponding to that logical page. In such applications, certain operations, such as for example deletion of a table or other related unit of data that spans multiple physical storage pages can be expensive in terms of system resources. Typically, each storage page includes a reference to the next storage page in a sequence of storage pages across which the data of the related are distributed for storage. As such, each storage page in the sequence must be read to determine the next storage page in the sequence. A similar read-intensive approach can be required to find a specific storage page in the sequence, for example to respond to a query or the like. Likewise, with previously available solutions, prefetching of pages (e.g. for a parallel load of multiple pages in a sequence) is only possible by serially loading and reading each page to determine which page is next in the sequence.

To address these and potentially other issues with currently available solutions, one or more implementations of the current subject matter provide methods, systems, articles or manufacture, and the like that can, among other possible advantages, retain addition page information at the persistence layer 112 so that red and write operations can be more efficiently targeted.

In an implementation, next page linkage information as well as page size information can be retained at the persistence layer 112 in addition to the mapping information (e.g. logical page number to physical location) that is typically retained at the persistence layer 112. Using this additional information, one or more pages in a chain or sequence of storage pages can be directly read or written to without the need to access other pages in the sequence or chain. This approach can enable de-allocating all pages from a data container as well as seeking to a certain position within a data container in the storage 114 with significantly reductions in required input/output activity. Prefetching of pages, for example including a parallel load of all pages from a container is also made feasible by implementations of the current subject matter that include at least retention and interpretation of next page linkage information by the persistence layer 112.

Figure 2:
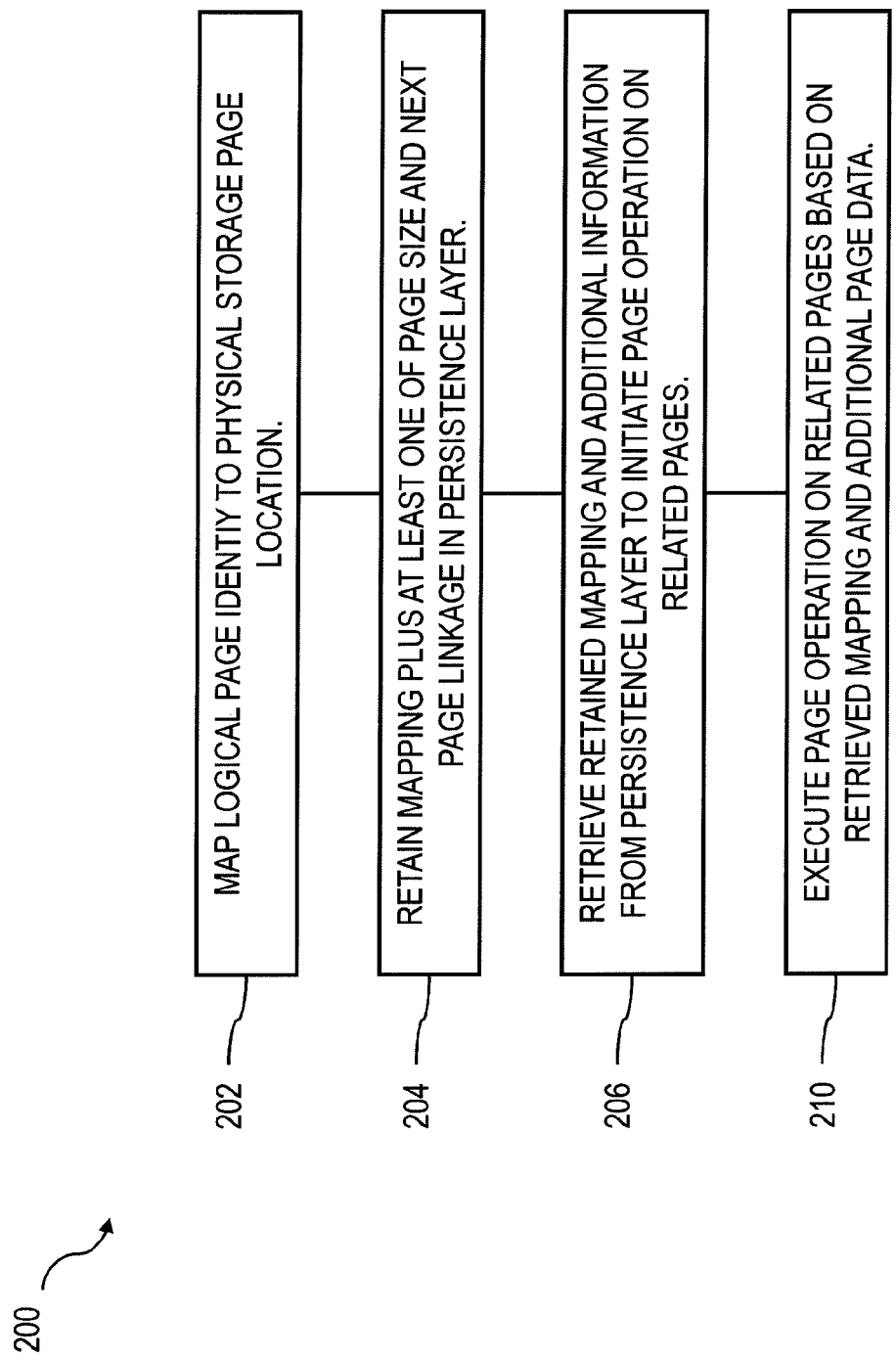
FIG. 2 is a process flow diagram illustrating features of a method consistent with implementations of the current subject matter.

FIG. 2 shows a process flow chart 200 illustrating features of a method at least some of which are consistent with an implementation of the current subject matter. At 202, a logical page identity for a logical page containing data storage application data is mapped to a physical storage page location in a storage where the data of the logical page are stored. The mapping and additional page data at retained at 204 within a persistence layer accessible to the data storage application. The additional page data include at least one of a size of the page and a next page linkage indicating a second page that follows the page in a page sequence of related pages. To initiate a page operation on the related pages, at 206 the retained mapping and additional page data are retrieved from the persistence layer, and at 210 the page operation is executed on the related pages based on the retrieved mapping and additional page data. In some examples, the page operation can include one or more of deleting, prefetching, traversing the sequence of related pages, and the like. The current subject matter can be advantageously applied in systems that use a shadow paging techniques as described herein, for example in a relational database application. However, these advantages can apply to any data storage application in which physical storage blocks in a longer term storage are allocated for writing data of logical pages that are read from and written to the storage in response to the needs of the data storage application.

Figure 3:
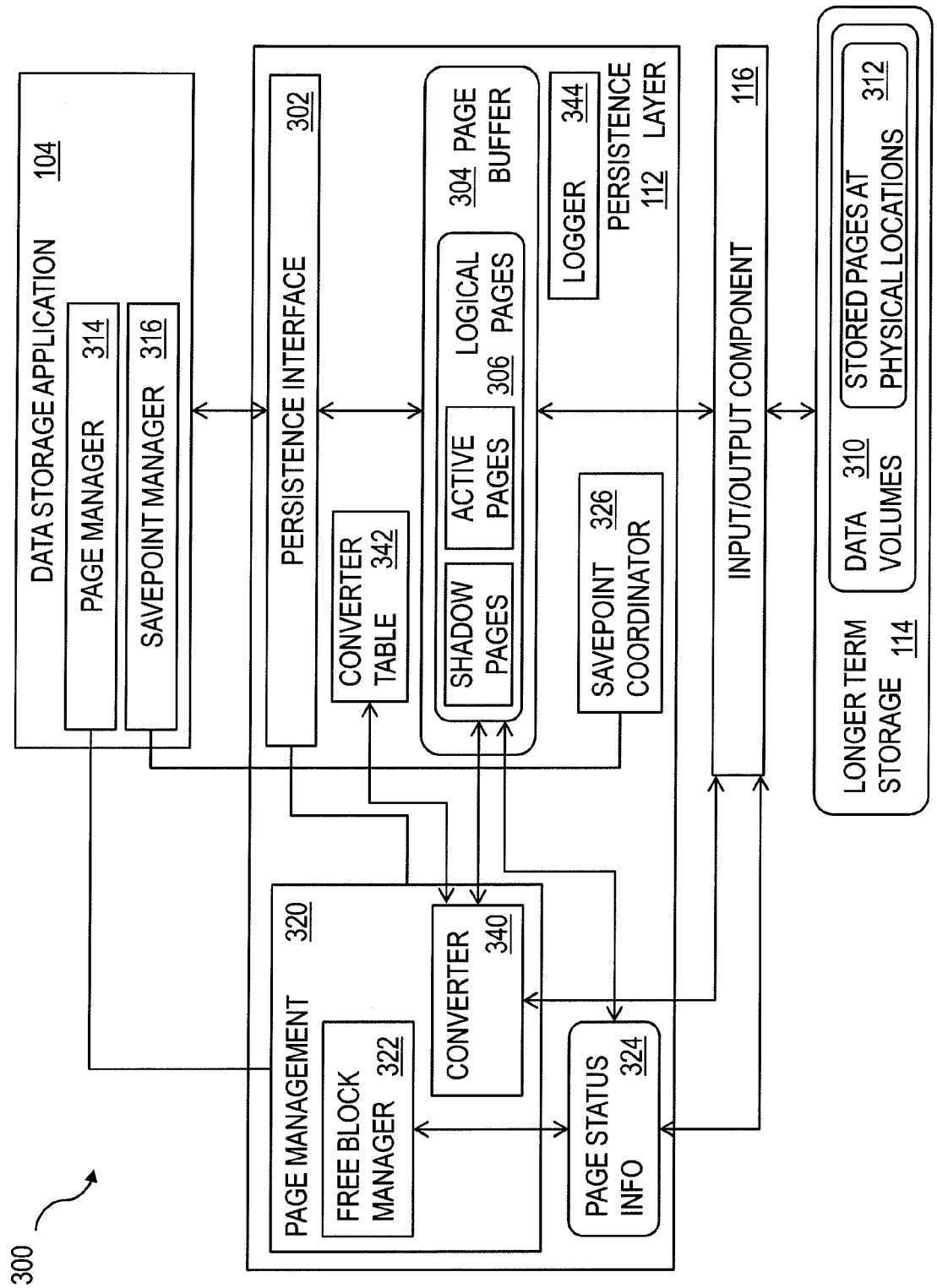
FIG. 3 is a diagram illustrating features of a system architecture at least some of whose features are consistent with implementations of the current subject matter.

FIG. 3 shows a software architecture 300 consistent with one or more features of the current subject matter. A data storage application 104, which can be implemented in one or more of hardware and software, can include one or more of a database application, a network-attached storage system, or the like. According to at least some implementations of the current subject matter, such a data storage application 104 can include or otherwise interface with a persistence layer 112 or other type of memory buffer, for example via a persistence interface 302. A page buffer 304 within the persistence layer 112 can store one or more logical pages 306, optionally can include shadow pages, active pages, and the like. The logical pages 306 retained in the persistence layer 112 can be written to a storage (e.g. a longer term storage) 114 via an input/output component 116, which can be a software module, a sub-system implemented in one or more of software and hardware, or the like. The storage 114 can include one or more data volumes 310 where stored pages 312 are allocated at physical memory blocks.

In some implementations, the data storage application 104 can include or be otherwise in communication with a page manager 314 and/or a savepoint manager 316. The page manager 314 can communicate with a page management module 320 at the persistence layer 112 that can include a free block manager 322 that monitors page status information 324, for example the status of physical pages within the storage 114 and logical pages in the persistence layer 112 (and optionally in the page buffer 304). The savepoint manager 316 can communicate with a savepoint coordinator 326 at the persistence layer 204 to handle savepoints, which are used to create a consistent persistent state of the database for restart after a possible crash.

In some implementations of a data storage application 104, the page management module of the persistence layer 112 can implement a shadow paging approach. The free block manager 322 within the page management module 320 can maintain the status of physical pages, and a converter component 340, which can be part of or in communication with the page management module 320, can be responsible for mapping between logical and physical pages written to the storage 114. The converter 340 can maintain the current mapping of logical pages to the corresponding physical pages in a converter table 342. The converter 340 can maintain a current mapping of logical pages 306 to the corresponding physical pages in one or more converter tables 342. When a logical page 306 is read from storage 114, the storage page to be loaded can be looked up from the one or more converter tables 342 using the converter 340. When a logical page is written to storage 114 the first time after a savepoint, a new free physical page is assigned to the logical page. The free block manager 322 marks the new physical page as "used" and the new mapping is stored in the one or more converter tables 342.

In some implementations, for example as shown in FIG. 3, logical pages 306 are loaded into the page buffer 304 in memory to provide read and write access. The page buffer 304 need not have a particular minimum or maximum size, but can in some implementations use some or all free memory that is not allocated for other data or tasks. If the memory is needed elsewhere, least recently used logical pages 306 can be removed from the page buffer 304. For example, if a modified page is chosen to be removed, that logical page 306 can be saved from the persistence layer 112 to longer term storage, for example by being passed to the input/output component 116 for writing to the storage 114.

The persistence layer 112 can ensure that changes made in the data storage application 104 are durable and that the data storage application 104 can be restored to a most recent committed state after a restart. Writing data to the storage 114 need not be synchronized with the end of the writing transaction. As such, uncommitted changes can be written to disk and committed changes may not yet be written to disk when a writing transaction is finished. After a system crash, changes made by transactions that were not finished can be rolled back. Changes occurring by already committed transactions should not be lost in this process. A logger component 344 can also be included to store the changes made to the data of the data storage application in a linear log. The logger component can be used during recovery to replay operations since last savepoint to ensure that all operations are applied to the data and that transactions with a logged "COMMIT" record are committed before rolling back still-open transactions at the end of a recovery process.

Figure 4:
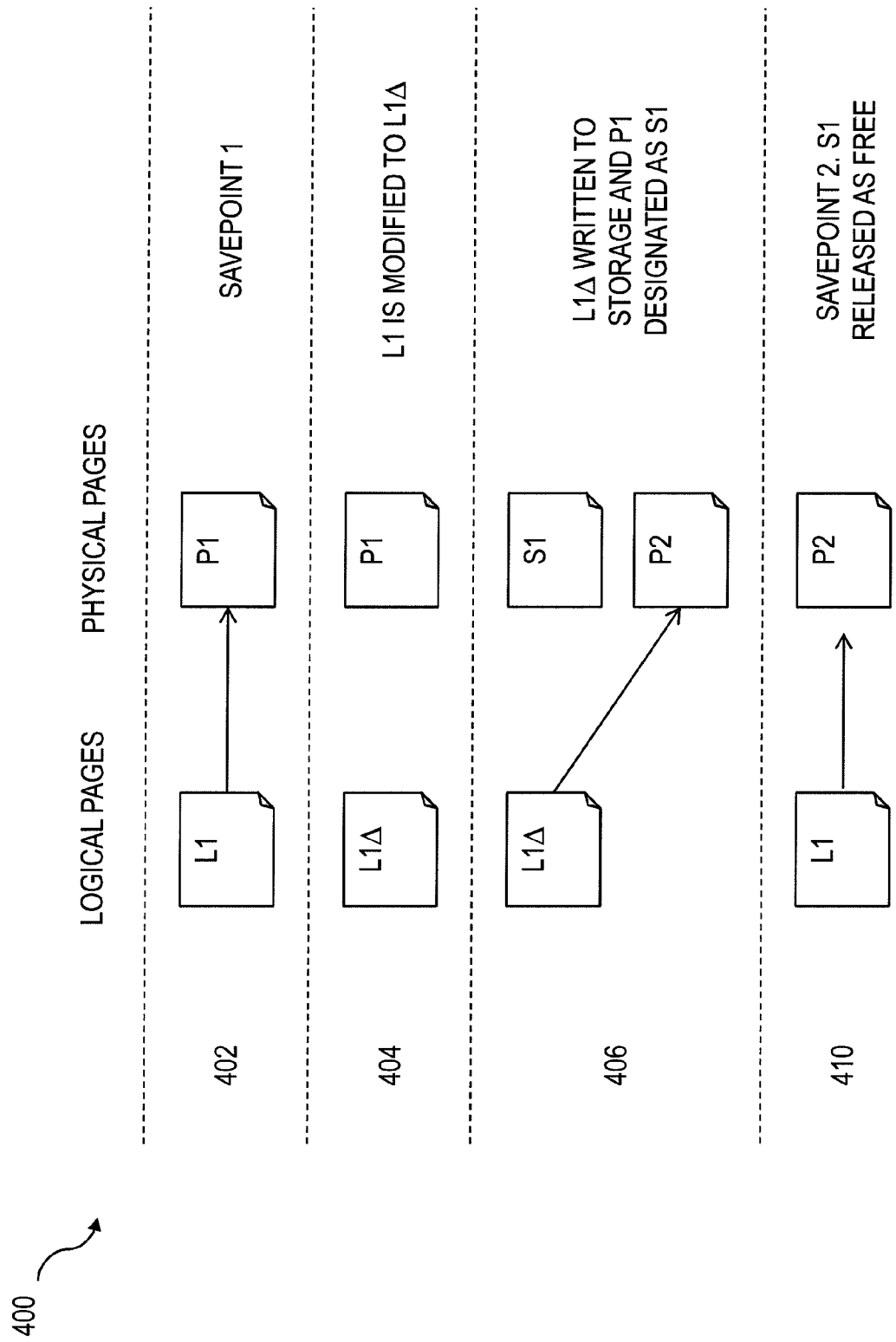
FIG. 4 is a logic flow diagram illustrating features consistent with one or more implementations of the current subject matter.

In an example of a shadow paging approach to retaining uncommitted changes, a shadow page that contains a savepoint version of a logical page is not overwritten until the next savepoint is successfully completed. This can be reflected in a page status table maintained by the system (e.g. in a free block manager as described below). As shown in the logical flow diagram 400 of FIG. 4, a logical page L1 is written to a first physical page P1 during a most recent savepoint at 402 and a mapping (L1, P1) is added to a converter table 342. After the savepoint, at 404 the logical page L1 is modified again to become L1Δ. When L1 needs to be written to the storage 114 again, for example because of cache replacement or because the next savepoint operation has begun, the first physical page P1 becomes a shadow page S1 and a new free first physical page P2 is assigned to the logical page L1. The first physical page P2 is marked as "used" and a new mapping (L1, P2) is written to the converter table 342 at 406. The old mapping is still available in an old version of the converter table that was stored with the most recent savepoint. The first physical page P1 is still needed to retain the shadow page S1, so its status is not set to "free." Instead, the first physical page P1 can be designated with a status of "free after savepoint." When the next savepoint is completed at 410, the status of the first physical page P1 can then be updated to "free."

In a complex data storage application, many instances of shadow pages, and in some cases sequences or chains of may be created between savepoints to preserve unwritten changes to a related unit of data. Selectively accessing the individual shadow pages or groups of shadow pages in a sequence or chain, for example if a change in the related unit of data subsequent to a savepoint alters only certain pages in a chain or sequence of pages in which the data of the related unit of data are stored and only those pages have shadow pages created, can be significantly streamlined using the current subject matter. At each operation that changes any aspect of a logical page, in addition to mapping information representing locations of associated physical pages (e.g. active pages and shadow pages), additional information about page size and page linkages are retained at the persistence layer 112 so that operations to be performed selectively on one or more storage pages can be accomplished without requiring that all storage pages in a chain or sequence be accessed.

Aspects of the subject matter described herein can be embodied in systems, apparatus, methods, and/or articles depending on the desired configuration. In particular, various implementations of the subject matter described herein can be realized in digital electronic circuitry, integrated circuitry, specially designed application specific integrated circuits (ASICs), computer hardware, firmware, software, and/or combinations thereof. These various implementations can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. A client and server are generally, but not exclusively, remote from each other and typically interact through a communication network, although the components of the system can be interconnected by any form or medium of digital data communication. Examples of communication networks include, but are not limited to, a local area network ("LAN"), a wide area network ("WAN"), and the Internet. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail herein, other modifications or additions are possible. In particular, further features and/or variations can be provided in addition to those set forth herein. For example, the implementations described above can be directed to various combinations and sub-combinations of the disclosed features and/or combinations and sub-combinations of one or more features further to those disclosed herein. In addition, the logic flows depicted in the accompanying figures and/or described herein do not necessarily require the particular order shown, or sequential order, to achieve desirable results. The scope of the following claims may include other implementations or embodiments.

What is claimed is:

1. A non-transitory computer program product storing instructions that, when executed by at least one programmable processor, cause the at least one programmable processor to perform operations comprising:
   mapping a logical page identity for a logical page containing data storage application data to a physical storage page location in a storage where the data of the logical page are stored to form mapping data;
   retaining, within a persistence layer accessible to the data storage application, the mapping data and additional page data, the additional page data comprising both a size of the logical page and a next page linkage indicating a second logical page that follows the logical page in a page sequence of related logical pages;
   retrieving the retained mapping and additional page data from the persistence layer to initiate a page operation on the related logical pages; and
   executing the page operation on the related logical pages based on the retrieved mapping and additional page data.

2. A computer program product as in claim 1, wherein the additional page data comprises the next page linkage indicating the second logical page that follows the logical page in the page sequence of related logical pages.

3. A computer program product as in claim 1, wherein the page operation comprises at least one of deleting the logical page and the second logical page, prefetching the logical page and the second logical page in parallel, and traversing the related logical pages in the page sequence.

4. A computer program product as in claim 1, wherein the logical page is a shadow page.

5. A system comprising:
   at least one programmable processor; and
   a machine-readable medium storing instructions that, when executed by the at least one programmable processor, cause the at least one programmable processor to perform operations comprising:
   mapping a logical page identity for a logical page containing data storage application data to a physical storage page location in a storage where the data of the logical page are stored to form mapping data;
   retaining, within a persistence layer accessible to the data storage application, the mapping data and additional page data, the additional page data comprising both a size of the logical page and a next page linkage indicating a second logical page that follows the logical page in a page sequence of related logical pages;
   retrieving the retained mapping and additional page data from the persistence layer to initiate a page operation on the related logical pages; and
   executing the page operation on the related logical pages based on the retrieved mapping and additional page data.

6. A system as in claim 5, wherein the data storage application comprises at least one of a database application and a network-attached storage system.

7. A system as in claim 5, wherein the page operation comprises at least one of deleting the logical page and the second logical page, prefetching the logical page and the second logical page in parallel, and traversing the related pages in the page sequence.

8. A system as in claim 5, wherein the logical page is a shadow page.

9. A computer-implemented method comprising:
   mapping a logical page identity for a logical page containing data storage application data to a physical storage page location in a storage where the data of the logical page are stored to form mapping data;
   retaining, within a persistence layer accessible to the data storage application, the mapping data and additional page data, the additional page data comprising both a size of the logical page and a next page linkage indicating a second logical page that follows the logical page in a page sequence of related logical pages;
   retrieving the retained mapping and additional page data from the persistence layer to initiate a page operation on the related logical pages; and
   executing the page operation on the related logical pages based on the retrieved mapping and additional page data.

10. A computer-implemented method as in claim 9, wherein the data storage application comprises at least one of a database application and a network-attached storage system.

11. A computer-implemented method as in claim 9, wherein the page operation comprises at least one of deleting the logical page and the second page, prefetching the logical page and the second logical page in parallel, and traversing the related logical pages in the page sequence.

12. A computer-implemented method as in claim 9, wherein the logical page is a shadow page.

13. A computer-implemented method as in claim 9, wherein at least one of the mapping, the retaining, the retrieving, and the executing are performed by at least one programmable processor of at least one computing system.

* * * * *